Aug. 7, 1934.                J. B. ARMITAGE                    1,969,393
                    MILLING MACHINE TRANSMISSION AND CONTROL
                         Filed April 11, 1932     5 Sheets-Sheet 1

INVENTOR
Joseph B Armitage
BY
Fred G Parsons
ATTORNEY

Aug. 7, 1934.  J. B. ARMITAGE  1,969,393
MILLING MACHINE TRANSMISSION AND CONTROL
Filed April 11, 1932   5 Sheets-Sheet 2

INVENTOR
Joseph B Armitage
BY
Fred G Parsons
ATTORNEY

Aug. 7, 1934.   J. B. ARMITAGE   1,969,393
MILLING MACHINE TRANSMISSION AND CONTROL
Filed April 11, 1932   5 Sheets-Sheet 4

INVENTOR
Joseph B Armitage
Fred A Parsons
ATTORNEY

Patented Aug. 7, 1934

1,969,393

UNITED STATES PATENT OFFICE 1,969,393

MILLING MACHINE TRANSMISSION AND CONTROL

Joseph B. Armitage, Wauwatosa, Wis., assignor to Kearney & Trecker Corporation, West Allis, Wis.

Application April 11, 1932, Serial No. 604,537

6 Claims. (Cl. 90—21)

This invention relates to machine tool transmission and control mechanism, particularly for milling machines.

An object of the invention is generally to simplify and improve the construction and operation of such machines and particularly for knee and column type milling machines.

A particular object is to provide an improved overload safety mechanism and more especially one which will provide for differences in operating characteristics or mechanical construction of different lines of travel or the branch transmission therefor, such, for instance, as are found in milling machines.

A further object is to combine such safety mechanism in an improved manner with other transmission and control mechanism of the machine, particularly in a milling machine and especially with respect to the transmission mechanism peculiar to a knee and column type of milling machine.

A further object is to provide a transmission mechanism for knee and column type milling machines, in which the feed and quick traverse rate is the same for both the horizontal lines of table travel but is materially reduced for the vertical path of travel, and with overload or safety mechanism and other transmission and control mechanism arranged in an improved and simplified manner for such a transmission.

A further object relates to the improved combination and relationship in a milling machine table transmission of various elements, whereby to accomplish an improved construction and control of the machine generally.

A further and more specific object is to provide in a machine, having a plurality of supports movable by different branch lines of a common power train, an overload release device interposed in said power train and arranged to yield in the event of excessive resistance to movement of any of said supports and prevent excessive stress in said power train, and a separate overload release device in at least one of said branch lines which differs from the others in some of the operating characteristics thereof, the separate device being arranged to yield in accordance with the particular requirements of the last mentioned branch.

A further specific object is to provide such a structure in which one or the other or both of the overload release devices are adjustable for a predetermined relative effect, such as, for instance, that under certain conditions the common device will continue to drive although the device individual to the one branch is released.

A further specific object is to interpose said separate overload release device in the drive for the vertical movement of the knee of a knee type milling machine.

Further objects and advantages will appear from the following specification and annexed drawings.

Like reference characters have been applied to like parts throughout the specification and accompanying drawings, in which:

Fig. 3a is a detail of certain mechanism indicated in Fig. 3.

Figure 1:
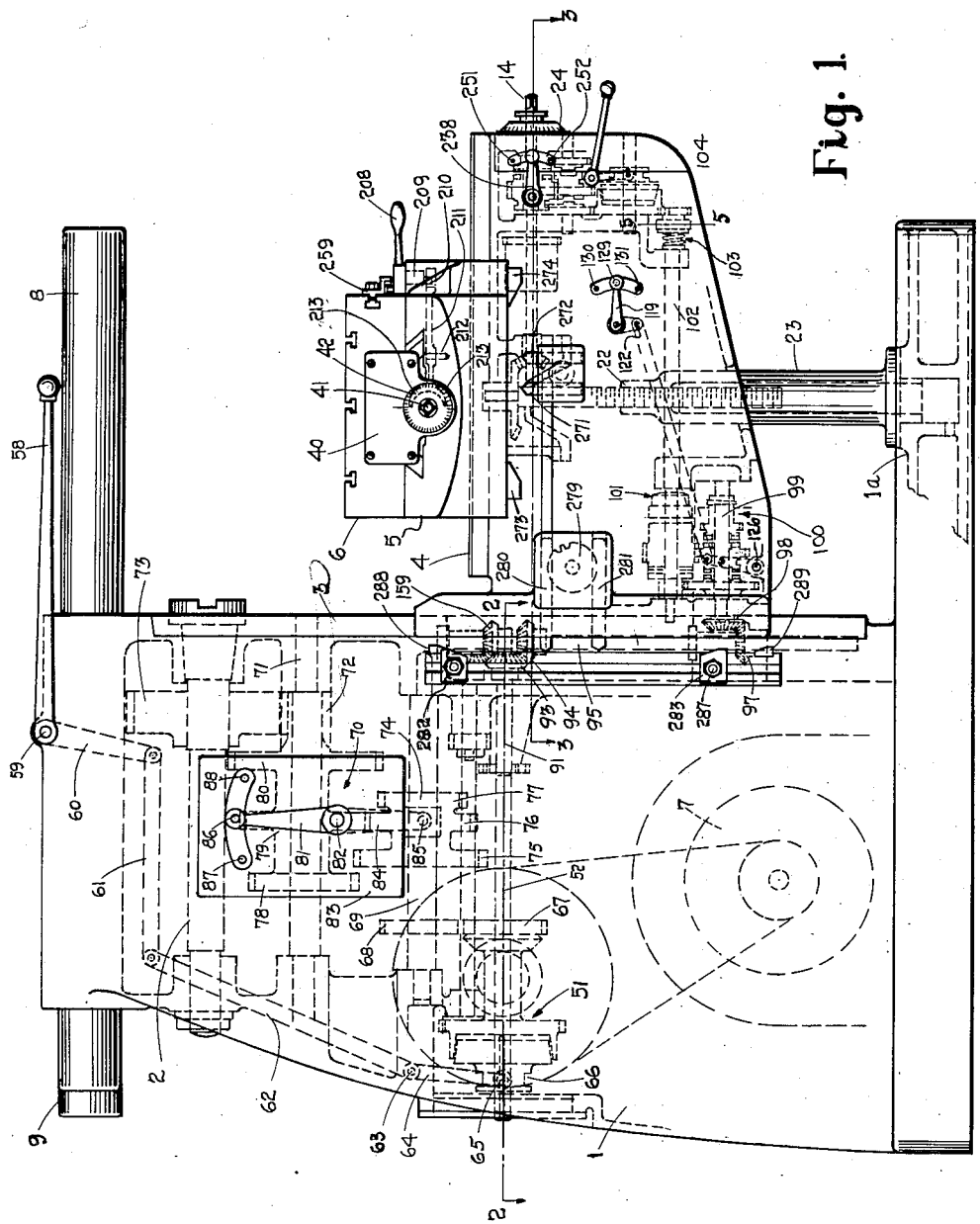
Fig. 1 is a left side elevation of a machine incorporating the invention.

The machine, as seen in Fig. 1, comprises a column, base, or support 1 having horizontally journaled therein at an upper level a tool spindle or support 2, the column having, vertically movable against a suitable face 3 thereof, a knee or support 4. The knee carries, slidable relative thereto toward and from column 1, a saddle or support 5 which in turn carries a table or work support 6 reciprocable relative to the saddle in a substantially horizontal path transverse to the axis of spindle 2. Spindle 2 and the various supports may be moved by power from a suitable power source, in the present instance represented as an electric motor 7 housed in a lower portion of column 1 and connected to drive the various elements through suitable power trains, fully described below. Overarms 8 and 9 are provided adjustably fixed with the column above spindle 2 for use in various operations of the machine in well known manner.

Figure 3:
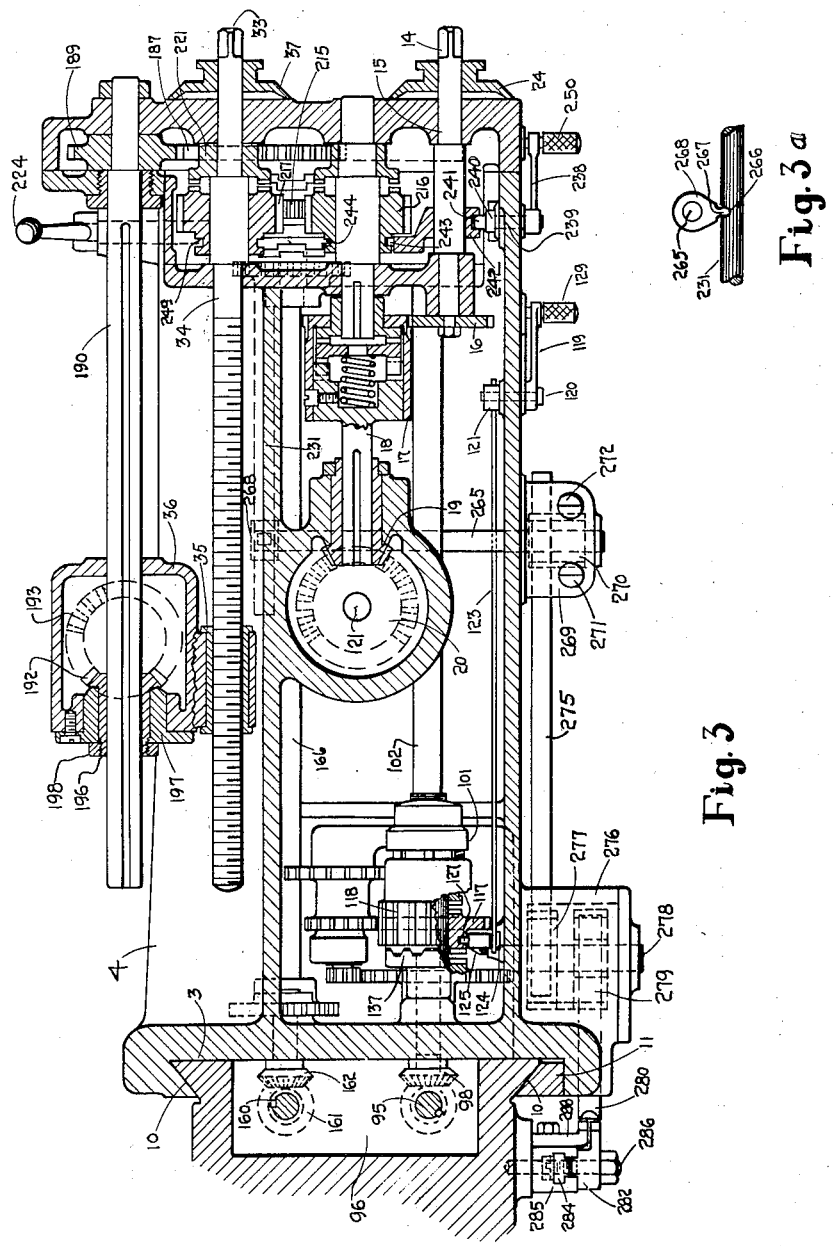
Fig. 3 is a horizontal sectional view taken on the line 3—3 of Fig. 1.
Figure 4:
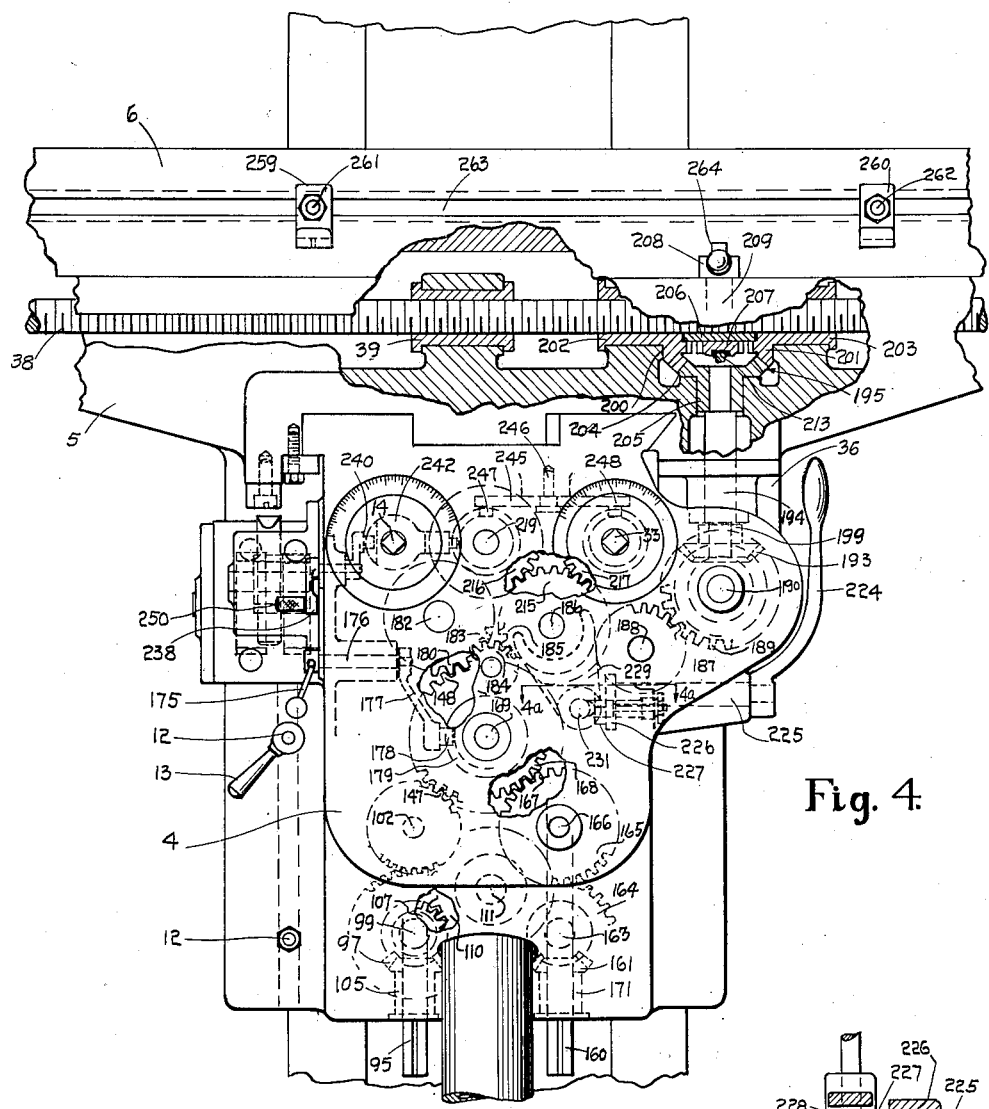
Fig. 4 is a front elevation of a portion of the machine partly broken away to show certain of the mechanism.

Knee 4, as more particularly shown in Fig. 3, is guided against surface 3 by means of slides of dovetailed or other appropriate type generally denoted by numerals 10—10, a gib 11 serving to clamp the knee rigidly with column 1 when desired, bolts such as 12, Fig. 4, serving to tighten the gib against the guide, one or more of the bolts being provided with a nut 13 of a form having an actuating handle or wrench portion to facilitate tightening thereof.

Knee 4 when unclamped may be vertically moved by the application of a crank, or the like, not shown, to a squared portion 14, Fig. 1, of a shaft 15, Figs. 3 and 6, the shaft being journaled in a front portion of knee 4 and driving, through a gear 16, a gear portion fixed with a housing member 17 forming part of an overload release device, later described. Member 17 is fixed with and drives a shaft 18 which drives, through bevel gears 19 and 20, Fig. 6, an elevating screw 21, the screw engaging a nut portion 22 fixed with a pedestal 23 supported from a projecting portion 1a of column 1, as particularly shown in Fig. 1.

A dial 24 is adjustably fixed with shaft 15 for determining movements and settings of knee 4 in familiar manner. Bevel gear 19, as shown in Fig. 6, has an extended sleeve or hub portion 25 journaled in a housing 26 depending from an upper wall of knee 4, sleeve 25 being keyed or otherwise suitably fixed with above mentioned shaft 18, and a nut or collar member 27 serving to locate gear 19 axially independently of shaft 18. Bevel gear 20 has an upwardly extending sleeve portion 28 journaled in another portion 29 of housing 20 constituting a thrust bearing serving to impose the weight of knee 4 and its attached parts upon screw 21. Sleeve 28 is keyed or otherwise fixed with screw 21 and a plate 30 fixed with screw 21 by means of a screw 31 prevents displacement of sleeve 28 from screw 21 and prevents relative axial movement between screw 21 and thrust bearing 29 which might tend to occur in the event that an attempt was inadvertently made to lower knee 4 without releasing the clamping engagement of gib 11.

A baffle member 32 is fixed in housing 26 surrounding screw 21 and serves to retain a small quantity of lubricant for gears 19 and 20 and to prevent lubricant from the gears from finding its way to pedestal 23, thus preventing the fluid from running down the pedestal to the outside of the machine.

Saddle 5 may be moved manually by the application of a crank, or the like, not shown, to a squared portion 33, Fig. 3, of a saddle screw 34 journaled in a portion of knee 4 and restrained from axial movement therein. The screw engages a nut portion 35 fixed with a housing 36 depending from saddle 4 into a recess formed in an upper portion of knee 4. Rotation of screw 34 will accordingly cause sliding movement of the saddle, the extent of such movement being indicated by means of a dial 37 adjustably fixed with the screw in familiar manner.

Table 6 may be reciprocated by rotation of a table screw 38, Fig. 4, engaging a nut portion 39 fixed with saddle 5, the screw being journaled in bearings such as 40, Fig. 1, fixed with the ends of table 6 and restrained against axial movement relative to the bearings. A squared portion 41 is provided on the screw for the reception of a crank, or the like, not shown, and a dial 42 adjustably fixed with the screw indicates the extent of movements of the table.

Figure 2:
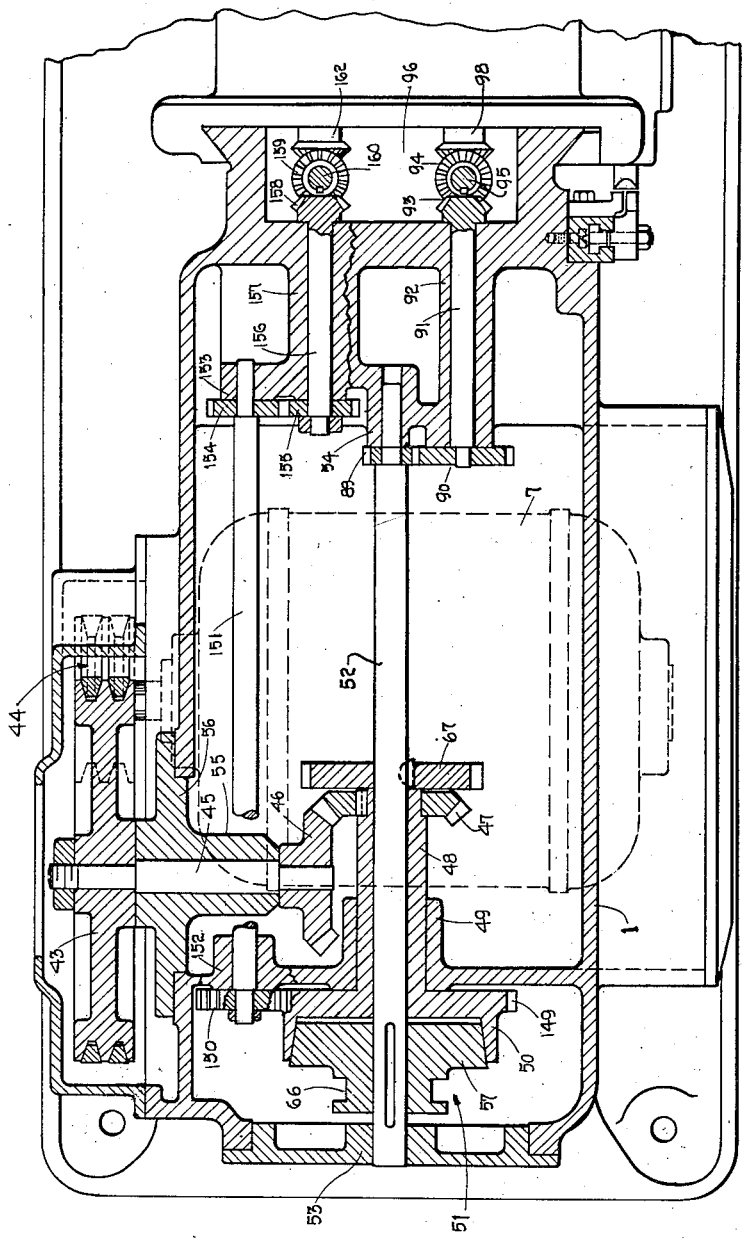
Fig. 2 is a horizontal sectional view taken on the line 2—2 of Fig. 1.

The power drives of the various machine elements originate in above mentioned motor 7 which drives a pulley 43, Fig. 2, through a multiple V-belt drive of familiar type generally denoted by numeral 44, pulley 43 being fixed with a driving shaft 45 which drives, through bevel gears 46 and 47, a sleeve 48 journaled in a bearing portion 49 fixed with column 1, sleeve 48 having fixed therewith a clutch member 50. Member 50 forms part of a main clutch generally denoted by numeral 51 which drives a shaft 52 journaled in sleeve 48 and suitable bearings 53 and 54 in column 1, transmission branch lines extending from shaft 52 to the various movable elements in the machine.

It will be noted that motor 7 in the present machine is mounted in column 1 with its axis disposed transversely to that of spindle 2. Various advantages arise from this disposition of the motor, both from superior accessibility of the motor itself and drive 44 and also from a superior distribution of the material of the column with regard to strength and rigidity. These features form part of a copending application of Edward J. Kearney, Serial No. 638,667, filed October 20, 1932, in which they are fully set forth and explained. Further discussion of this feature will accordingly not be taken up in this application.

Shaft 45 is journaled in a bearing 55 fixed with a removable closure member 56 arranged to close an opening in column 1. Clutch 51 comprises above mentioned member 50 and an inner member 57 slidably keyed with shaft 52, the members having interengaging friction surfaces of suitable type, whereby member 57 when forced to the right, as seen in Fig. 2, will be engaged and driven by member 50. Member 57 may be so moved from a hand lever 58, Fig. 1, fixed with a shaft 59 journaled in an upper portion of column 1 and carrying within the column an arm 60 extending downwardly, preferably between overarms 8 and 9 and actuating, through a pivoted link 61, a lever 62 fixed with a transverse shaft 63. Shaft 63 carries a shifter arm 64 extending downwardly and carrying a pivoted shoe, or the like, 65 engaging an annular groove 66, Fig. 2, in clutch member 57. Upward movement of lever 58 will accordingly cause releasing of clutch 51, while downward movement of lever 58 will cause engagement of the clutch and driving of shaft 52 and its connected elements.

The drive to spindle 2 originates in a gear 67 fixed with shaft 52, the gear driving a gear 68, Fig. 1, fixed with a shaft 69 journaled in the column and driving, through a rate changer generally denoted by numeral 70, Fig. 1, a shaft 71, shaft 71 driving spindle 2 through gears 72 and 73 fixed respectively with the shaft and spindle.

Rate changer 70 comprises a unitary member 74 slidably keyed with shaft 69 and comprising gears 75, 76, and 77 engageable one at a time respectively with gears 78, 79, and 80 fixed with shaft 71, the gears being of different sizes, whereby engagement of different pairs will result in different speeds in shaft 71 and accordingly in spindle 2. Member 74 may be so shifted from a hand lever 81 fixed with a shaft 82 journaled in a closure member 83 fixed with column 1, the shaft carrying within the column a shifter lever 84 extending downwardly and carrying pivoted thereto a shoe 85 engaging the sides of gear 76, movements of lever 81 to the right and left accordingly causing sliding of member 74 to the left and right, as seen in Fig. 1. Lever 81 has a grip portion 86 comprising a spring pressed plunger engageable with one or another of holes such as 87 and 88 formed in closure member 83 for maintaining the parts in desired shifted positions.

The various movable supports may be moved alternatively at a feed or a rapid traverse rate by power from power source 7 by means of a power train including three branch lines, the change from feed to rapid traverse or vice versa being simultaneous in all three branches. The means and mechanism by which this is accomplished are fully described below.

A feed drive for the machine originates in shaft 52, Fig. 2, the shaft driving, through reduction gears 89 and 90, a shaft 91 journaled in a bearing 92 and driving, through bevel gears 93 and 94, a vertical shaft 95 disposed in a recess 96 in the front wall of column 1. Shaft 95 drives, through bevel gears 97 and 98, Fig. 1, a shaft 99 journaled in knee 4 and forming a part of a feed rate changer generally denoted by numeral 100. The drive continues from rate changer 100 through an overload release device generally denoted by numeral 101, a shaft 102 and an overrunning clutch generally denoted by numeral 103 to a clutch member 104, Fig. 6, forming the terminal element of the feed train.

The feed drive being operated from shaft 52, Fig. 2, is responsive to the engagement of clutch 51, the feed accordingly automatically starting and stopping simultaneously with the spindle. Gears 89 and 90 are of different sizes whereby shaft 91 runs at a substantially slower rate than shaft 52. Shaft 95 constitutes means for transmitting the feed drive from the stationary column to the relatively movable knee, the shaft being suitably restrained from axial movement in recess 96 and slidably keyed with bevel gear 97, the gear, as more particularly shown in Fig. 4, having an elongated hub portion 105 journaled in a lower wall of knee 4, the gear rising and falling with the knee and sliding on shaft 95.

Figure 6:
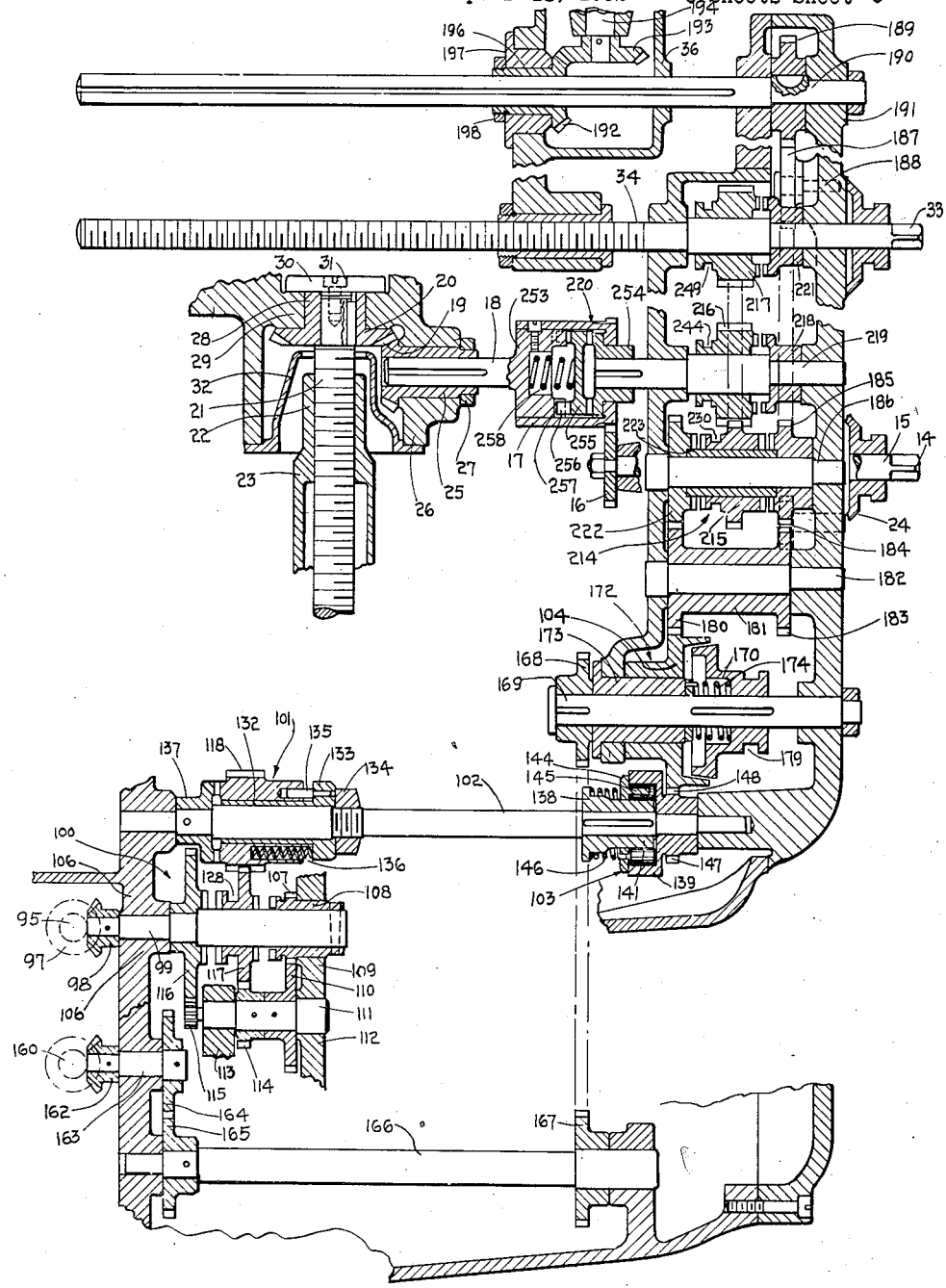
Fig. 6 is a sectional development of certain power trains in the machine.

The rate changer 100, Fig. 6, comprises above mentioned shaft 99 which is journaled in a bearing 106 in a wall of knee 4 and carries a clutch gear 107 fixed therewith, the gear having a hub portion 108 journaled in a bearing 109 supported in the knee. Gear 107 drives a gear 110 fixed with a countershaft 111 journaled in bearings 112 and 113, the shaft driving, through gears 114 and 115 fixed therewith, gears 116 and 117 respectively. Gear 116 is journaled on above mentioned shaft 99 and restrained against axial movement by bearing 106 and a suitable shoulder on shaft 99, while gear 117 is slidably journaled on shaft 99. Gear 117 has suitable clutch teeth for engagement when moved to the left in Fig. 6 with complementary clutch teeth formed on gear 116 and other clutch teeth for engagement when moved to the right with complementary clutch teeth formed on clutch gear 107, the gear meshing in all positions with an elongated gear 118 forming a part of above mentioned overload release device 101.

The operation of the rate changer is as follows: With gear 117 in the position shown, the drive is from shaft 99 through gear 107 and gear 110 to countershaft 111 and from shaft 111 through gear 114 to gear 117 which, as above described, is journaled on shaft 99, and through gear 117 to gear 118 and accordingly to shaft 102 and the feed mechanism. If gear 117 is moved to the right, as seen in Fig. 6, it will disengage from gear 114 and be clutched to clutch gear 107. The drive will then be from shaft 99 through clutch gear 107 directly to gear 117 and on to shaft 102 as before, and the reduction through gears 107, 110, and 114 being eliminated, the resulting speed being higher than the previously described position of gear 117. With gear 117 shifted to the left in Fig. 6, it will again be disengaged from gear 114 and will be clutched to gear 116, the drive then being from shaft 99 through gears 107 and 110 to countershaft 111 and from shaft 111 through gears 115, 116, and 117 to gear 118 and shaft 102 as before, the further reduction effected by gears 115 and 116 causing a slower rate in shaft 102 than that resulting from the first described position of gear 117.

Gear 117 may be so shifted from a hand lever 119, Figs. 1 and 3, fixed with a shaft 120 journaled in a wall of knee 4 and carrying within the knee an arm 121 actuating, through a pivot pin 122, a shifter link 123 extending backwardly in knee 4 and actuating, through a pivot pin 124, a lever 125 fulcrumed on a stud 126 fixed with the knee, lever 125 carrying a pivoted shoe, or the like, 127 engaging an annular groove 128, Fig. 6, in gear 117. Up and down movement of lever 119 will accordingly cause right and left movement of gear 117. Lever 119 has a grip portion 129 comprising a spring pressed plunger arranged to engage suitable holes or sockets such as 130 and 131, Fig. 1, for holding the parts in shifted positions.

Overload release device 101 comprises above mentioned gear 118 which is slidably journaled on a sleeve 132, Fig. 6, which is in turn journaled on shaft 102. Sleeve 132 has a flange portion 133 bearing against a nut, or the like, 134 adjustably fixed with shaft 102 whereby to prevent axial movement of sleeve 132, and relative rotation between gear 118 and sleeve 132 is prevented by means of a plurality of pins 135 fixed with flange 133 and extending into suitable bores formed in gear 118, the gear accordingly being free to slide on sleeve 132 but fixed against relative rotation. Gear 118 is continuously urged to the left, as seen in Fig. 6, by a plurality of coil springs 136 received in other bores in gear 118 and bearing against flange 133, the effect of the springs being adjustable by movements of nut 134. Gear 118 has suitable clutch teeth for engagement when forced to the left with complementary clutch teeth upon a clutch member 137 fixed with shaft 102. The clutch teeth, as more particularly shown in Fig. 3, are of such a form as to tend, whenever torque is applied to gear 118, to force the gear to the right against the force exerted by the springs 136, but the springs are adjusted so that they are sufficiently powerful to prevent such movement of gear 118 under all normal loads imposed upon the transmission. In the event of excessive torque developing in the feed train, however, springs 136 will be overcome by the leftward thrust of the interengaging clutch teeth, the teeth being forced out of engagement by movement of gear 118 to the right and the gear and sleeve 132 will be allowed to rotate relative to shaft 102, thereby relieving the excessive torque and limiting it to a predetermined safe value.

Figure 5:
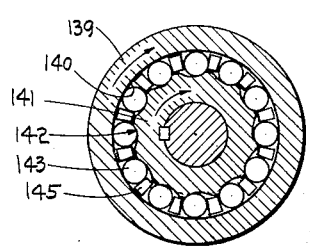
Fig. 5 is a sectional view of an overrunning clutch taken on the line 5—5 of Fig. 1.

Overrunning clutch 103, as more particularly shown in Figs. 5 and 6, comprises inner and outer members 138 and 139 respectively, member 138 being fixed with shaft 102 and member 139 being journaled on shaft 102 and having a cylindrical bore 140 in which extends a cam portion 141 of member 138. Portion 141 is provided with a series of cam recesses 142 and a plurality of rolls 143 are disposed in the recesses between portion 141 and bore 140. The contour of recesses 142 is such that upon rotation of member 141 in one direction, as indicated in Fig. 5, rolls 143 will be caused to wedge between portion 141 and bore 140 and transmit a positive drive between members 138 and 139. In the event that member 139 tends to run at a greater rate than member 138, rolls 143, owing to the contour of recesses 142, will relinquish their grip upon bore 140 and retract into recesses 142, allowing member 139 to overrun member 138 without interference. To insure such action of rolls 143 they are spaced and guided by means of a cage 144 journaled on member 138 and provided with a plurality of fingers 145 extending between the rolls. The cage is continuously urged in a direction counter to the rotation of member 138 by means of a suitable spring 146, whereby the rolls are maintained in continuous yielding engagement with bore 140. Member 139 has a gear 147 fixed therewith and driving a gear 148 fixed with above mentioned clutch member 104.

A train for rapid traverse of the various movable elements originates in a gear 149, Fig. 2, fixed with clutch member 50. The clutch member rotates continuously regardless of the condition of engagement of clutch 51 and accordingly the rapid traverse drive is available whether or not clutch 51 is engaged. Gear 149 drives, through a gear 150, a shaft 151 journaled in suitable bearings 152 and 153 in column 1, the shaft driving, through gears 154 and 155, a shaft 156 journaled in a suitable bearing 157 in a front wall of the column. Shaft 156 drives, through bevel gears 158 and 159, disposed in above mentioned recess 96, a vertical shaft 160 which in turn drives, through a bevel gear 161, Figs. 3 and 4, a bevel gear 162. Bevel gear 162, as more particularly shown in Fig. 6, is fixed with a shaft 163 journaled in a wall of knee 4 and driving, through gears 164 and 165, a shaft 166 extending forwardly in the knee. Shaft 166 carries a gear 167 driving, through a gear 168, a shaft 169 carrying slidably keyed therewith a clutch member 170 forming the terminal element of the rapid traverse train.

Shaft 160 is suitably journaled in a recess 96 and restrained from axial movement therein and gear 161 is provided with a downwardly extending sleeve or hub portion 171, Fig. 4, the hub portion being slidably keyed with shaft 160 and journaled in a lower wall of knee 4, the shaft and gear furnishing the means of transmitting the rapid traverse drive from the stationary column to the relatively movable knee. The feed and rapid traverse trains combine in a rapid traverse clutch generally denoted by numeral 172, Fig. 6, which comprises above mentioned clutch members 104 and 170, member 104 being journaled on a sleeve 173 fixed with a portion of knee 4 and serving as a bearing for shaft 169. Members 104 and 170 are provided with complementary, interengaging friction surfaces whereby member 170, which normally rotates at a high rate, may drive member 104 at a correspondingly high rate when moved to the left as seen in Fig. 6, overrunning clutch 103 permitting such rapid movement without interference from or with shaft 102, as above explained. A spring 174 serves to normally maintain the clutch members separated and they may be engaged when desired by actuation of a hand lever 175, Fig. 4, the lever being fixed with a shaft 176 journaled in a wall of knee 4 and carrying a shifter arm 177 extending downwardly and providing a pivoted shoe, or the like, 178 extending into engagement with an annular groove 179 in clutch member 170. Depressing of lever 175 will accordingly cause engagement of clutch 172 and operation of the connected mechanism at a rapid traverse rate, spring 174 disengaging the clutch upon release of lever 175 and the mechanism automatically resuming operation at a feed rate.

The drive to table 6 continues as follows: Gear 148 drives, through a gear 180, a sleeve 181 journaled on a stud 182, the sleeve driving, through gear 183, an idler 184, a gear 185 journaled on a stud 186, an idler 187 journaled on a stud 188, and a gear 189, a shaft 190. Shaft 190 is journaled in a bearing 191 and extends backwardly into above mentioned housing 36, the shaft driving, through bevel gears 192, 193, Fig. 4, a vertical shaft 194 extending into saddle 5.

Shaft 194 drives table screw 38 through a reverser generally denoted by numeral 195. This reverser, as will appear below, is individual to the drive to table 6 and does not affect the movement of any of the other supports.

Gear 192, as particularly shown in Figs. 3 and 6, has a backwardly extending sleeve or hub portion 196 journaled in a closure member 197 fixed with housing 36 and is slidably keyed with shaft 190, suitable means such as a collar 198 restraining the gear against axial movement relative to housing 36.

Gear 193 has a hub portion 199, Fig. 4, disposed in housing 36 and serving to fix the gear on shaft 194.

Reverser 195 comprises bevel gears 200 and 201 spaced apart and journaled by means of sleeve or hub portions 202 and 203 respectively in suitable bearings fixed with saddle 5, the hubs having coaxial bores embracing for axial movement therein table screw 38. The gears are driven in opposite directions from shaft 194 by means of a bevel gear 204 fixed with shaft 194 by means of a hub portion 205 extending downwardly and forming a journal for shaft 194. A sleeve or bushing 206 is slidably keyed with table screw 38 between gears 200 and 201 and has slidably keyed thereon a clutch member 207, the member being provided with clutch teeth for engagement when moved, for example, to the left with complementary clutch teeth on gear 200 and with other clutch teeth for engagement when moved to the right with complementary clutch teeth on gear 201, the spacing of the gears being such that clutch member 207 may take a position between the gears and disengaged from both. The clutch accordingly provides means for readily connecting table screw 38 with a gear running in one direction or with another gear running in the opposite direction, as well as a means of interrupting the power drive to the screw.

Clutch member 207 may be so shifted from a hand lever 208 fixed with a vertical shaft 209 which, as more particularly shown in Fig. 1, operates, through an eccentric pin 210, a lever 211 fulcrumed on a stud 212 fixed in saddle 5, the lever carrying a fork portion 213 engaging a suitable annular groove formed in clutch member 207, as shown in Fig. 4. Movement of lever 208 to the left and right will accordingly cause shifting of clutch member 207 and the parts may be so arranged that movement of the lever in a given direction will cause movement of table 6 in the corresponding direction, movement of the lever to an intermediate position stopping the movement of the table, as above suggested.

Power movement of knee 4 and saddle 5 may be obtained through the following mechanism: Sleeve 181 and gear 185, Fig. 6, constitute parts of a reverser generally denoted by numeral 214 which drives, through a clutch gear 215, other clutch gears 216 and 217, gear 216 driving, through a clutch 218, a shaft 219 which drives, through an overload release device generally denoted by numeral 220, above mentioned shaft 18.

Gear 217 may drive, through a clutch 221 above mentioned, saddle screw 34.

Reverser 214 comprises above mentioned gear 185 and a gear 222 journaled on stud 186 and spaced apart by means of a sleeve 223, a gear 222 being driven in one direction from above mentioned gear 180, and gear 185 being driven, as above explained, in the opposite direction from gear 183 through idler 184. Gear 215 constitutes a clutch member and is journaled on sleeve 223 and provided with suitable clutch teeth for engagement when moved, for example, to the left, with complementary clutch teeth formed on gear 222. The gear has other clutch teeth for engagement when moved, for example, to the right, with complementary clutch teeth formed on gear 185, the direction of rotation of gear 215 and accordingly of gears 216 and 217 depending therefore on which of gears 222 and 185 is engaged with gear 215. Gear 215 has an intermediate or neutral position in which it is engaged with neither of gears 222 or 185.

Figure 4A:
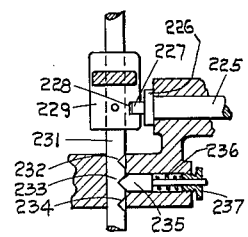
Fig. 4a is a sectional view taken on the line 4a—4a of Fig. 4.

Gear 215 may be shifted by means of a hand lever 224, Fig. 4, fixed with a shaft 225, see also Fig. 4a, journaled in a wall of knee 4 and having fixed therewith a downwardly extending crank portion 226 carrying a pin, or the like, 227 engaging a suitable slot 228 in a shifter fork member 229. Fork 229 extends upwardly into engagement with an annular groove 230, Fig. 6, formed in clutch gear 215, movement of lever 224 toward and from the front of the machine accordingly shifting gear 215 into one or another of its operative positions. Fork 229 is fixed with a shifter rod 231 extending backwardly in knee 4 and slidable therein, the rod being provided with notches 232, 233, and 234 engaged by a slidable detent plunger 235 yieldably engaged therewith by means of a spring 236 adjustably positioned in a suitable bore in knee 4 by a plug, or the like, 237.

Gears 216 and 217, Fig. 6, are slidably journaled respectively on shaft 219 and saddle screw 34 and have suitable clutch teeth for engagement when moved to the right with clutches 218 and 221, the clutches being fixed respectively with the shaft and screw. Gears 216 and 217 may be dependently shifted from a hand lever 238, Figs. 3 and 4, the lever being fixed with a shaft 239 journaled in a wall of knee 4 and carrying within the knee a shifter arm 240 actuating, through a pin 241, a shifter fork 242 slidably journaled on above mentioned shaft 15, the fork having a portion 243 engaging an annular groove 244 in gear 216. Up and down movement of lever 238 will accordingly cause left and right movement respectively of gear 216.

A lever 245, Fig. 4, fulcrumed on a stud 246 fixed in knee 4 engages by means of pins, or the like, 247 and 248 respectively groove 244 in gear 216 and a groove 249 in gear 217. The gears are accordingly dependently movable, lever 245 being so formed and positioned as to prevent engagement of more than one gear at a time. The two gears may accordingly be controlled from lever 238, shifting of gear 216 controlling gear 217 through lever 245. Lever 238 has a grip portion 250 comprising a spring pressed plunger engageable with one or another of holes such as 251 and 252, Fig. 1, for maintaining the parts in shifted position, there being an intermediate position in which both gears 216 and 217 are disengaged.

It will be noted that overload release device 101, Fig. 6, transmits power movement selectively to all the movable work supports, namely, the table 6, the saddle 5, and the knee 4. Overload conditions arising from movement of any of these would accordingly be relieved by action of device 101. It is advisable, however, to provide a rate of vertical movement of knee 4 different and preferably slower than that of the horizontal movement of the table and saddle. This may be accomplished in any suitable manner, several well known expedients being readily adaptable, but in the present instance it is done by providing a reduction of rate between gears 19 and 20. Thus rates of power movement of knee 4 will be substantially less than those of the other movable supports. It follows, therefore, that the maximum torque possible of development in elevating screw 21 before slipping of release device 101 is correspondingly greater than the maximum possible in saddle screw 34 or table screw 38. Thus if device 101 is adjusted to yield at a maximum safe load for the table or saddle, it will not yield during operation of elevating screw 21 until the predetermined maximum value has been substantially exceeded. On the contrary, if device 101 is adjusted for a safe maximum load on elevating screw 21, it will yield at substantially less than the maximum capacity of saddle screw 34 or table screw 38. It is to obviate this difficulty that the second overload release device 220 is provided between shafts 219 and 18. Device 101 may accordingly be adjusted for a maximum safe load on the saddle and table, device 220 serving to relieve excessive loads upon screw 21 independently of device 101.

This principle might be extended, of course, to other power trains in the machine in which the desirability of it is indicated, and such is entirely within the contemplation of the invention.

Device 220 comprises above mentioned housing 17 which is fixed with a flange or head portion 253 fixed with shaft 18, the housing extending to the right, as seen in Fig. 6, and having a portion embracing a clutch member 254 fixed with shaft 219. Clutch member 254 has clutch teeth engageable with complementary teeth on a clutch member 255 in housing 17, the member having a plurality of lugs 256 engaging suitable slots 257 formed in head portion 253. Clutch member 255 is forced to the right by means of a suitable spring 258 and accordingly yieldably maintained in engagement with clutch member 254. Shaft 219, therefore, normally drives shaft 18 through clutch member 254 and clutch member 255. The clutch teeth on members 254 and 255, are, however, of such a form as to tend to force clutch member 255 to the left, thereby allowing relative rotation between shaft 254 and clutch member 255, lugs 256 and slots 257, however, being of such extent as to remain in engagement regardless of possible movements of clutch 255. In the event that excessive torque develops in shaft 219, the tendency of clutch member 255 to move to the left becomes sufficiently strong to overcome spring 258 and slipping is allowed between clutch members 254 and 255. Thus although a ratio is used in the drive to knee 4 providing a slower movement of the knee than that of saddle 5 and table 6, the corresponding increase in maximum force ordinarily obtainable by such ratio is prevented by release device 220.

Automatic control of the supports may be provided by any suitable or convenient mechanism. For example, in the present embodiment table 6 may be automatically stopped at predetermined points by means of adjustable dogs 259 and 260, Figs. 1 and 4, fixed with the table by means of bolts, or the like, 261 and 262 respectively engaging a T-slot 263 formed in the table, the dogs after predetermined movement of the table engaging a pin 264 extending upwardly from a portion of control lever 208 and swinging the lever to its neutral position in which clutch 207 is disengaged and the drive to table screw 38 is interrupted. Dog 259 actuates the lever at the conclusion of movement to the right of table 6, while dog 260 actuates the lever after opposite movement thereof.

Control of the movement of knee 4 and saddle 5 is effected on above mentioned reverser 214 as follows: Shifter rod 231, as shown in Fig. 3, extends backwardly into knee 4 and actuates a transverse shaft 265 journaled in the knee, the rod having a slot 266, as more particularly shown in Fig. 3a, engaging a tooth portion 267 on a lever 268 fixed with shaft 265. Shaft 265 extends into a housing 269 fixed with knee 4 and actuates, through a gear 270, trip plungers 271 and 272 vertically slidable in housing 269. Shifting of above mentioned reverser gear 215 by means of handle 224 will accordingly cause rising of one of plungers 271 and 272 and falling of the other. If at the same time gear 217 is engaged with clutch member 221, movement of saddle 5 will take place, provided either the feed or rapid traverse train is in operation. The parts are so arranged that upon movement of saddle 5 to the left, Figs. 1 and 3, plunger 272 will be raised, while upon movement of saddle 5 to the right, plunger 271 will be raised. The plungers after predetermined movement of saddle 5 are engaged respectively by dogs 273 and 274 adjustably fixed with saddle 5, thus shifting gear 215 to its neutral position and stopping the movement of the saddle.

Shaft 265 through gear 270 actuates a shifter rod 275 slidable in housing 269 and extending backwardly into a housing 276 fixed with knee 4, the rod being provided with suitable rack teeth and actuating, through a gear 277, a shaft 278 journaled in the housing and carrying a gear 279. Gear 279, as more particularly shown in Fig. 1, actuates plungers 280 and 281 slidable in housing 276. Shifting of gear 215 accordingly also causes movement of plungers 280 and 281, the parts being so arranged as to extend plunger 280 upon upward movement of knee 4 and to extend plunger 281 upon downward movement thereof. The plungers are engaged respectively by dogs 282 and 283 adjustably fixed in a T slot 284, Fig. 3, formed in a bar member 285 fixed with column 1, the dogs being clamped by means of suitable bolts, or the like, 286 and 287 in predetermined adjusted position. Dog 282 accordingly operates to stop upward movement of knee 4, while dog 283 operates to stop downward movement thereof. Permanent dogs 288 and 289 are fixed with bar 285 to interrupt such travel of the knee at the extreme limits of available movement thereof in the event either of dogs 282 or 283 is not in position to cause such a stop. As apparent from Fig. 3, at either extreme setting of dogs 282 and 283, they are coextensive with dogs 288 and 289, whereby the maximum available travel of knee 4 is not diminished and may be obtained without entirely removing dogs 282 and 283.

It is to be understood that the means disclosed for automatic control of the table, knee, and saddle are illustrative merely, it being contemplated that other types of automatic control might be used of a type, for example, which would permit automatic reversal of the controlled member or automatic change from feed to rapid traverse or vice versa. Numerous arrangements capable of such operation are well known however and for the sake of brevity and clearness their description and illustration are omitted in the present instance.

The above being a complete description of an illustrative embodiment of the invention, what is claimed is:

1. In a milling machine, the combination of a column, a tool spindle rotatably supported from said column, a work table supported from said column, said spindle and table being relatively movable in a plurality of paths respectively having different operating characteristics, a power train connectible to rotate said spindle, and transmission mechanism for said relative movement including a plurality of overload release devices respectively having maximum torque capacity corresponding to the different operating characteristics of the different paths.

2. In a milling machine, the combination of a column, a tool spindle rotatably supported from said column, a work table supported from said column for reciprocatory movement in a path transverse to the axis of said tool spindle and for movement in a vertical path, a power train connectible to rotate said spindle, and transmission mechanism for said movements of said work table including a first line connectible to move said table in said reciprocatory movement, a second line connectible to move said table in said vertical path, said branch lines providing different operating characteristics for the different paths, and a plurality of overload devices one of which is located in one of said branch lines and provides maximum torque capacity corresponding to the operating characteristics thereof.

3. In a milling machine, the combination of a base, a tool spindle rotatably supported from said base, a work table supported from said base, said spindle and table being relatively bodily movable in a plurality of paths transverse to one another, one of said paths being transverse to the axis of said spindle, a power train connectible to rotate said spindle, and transmission mechanism for said relative movement including a plurality of lines respectively transmitting different feed rates, and a plurality of overload release devices for said relative movement and of different effect, said devices being constructed and positioned for effecting substantially the same maximum feeding pressure in each of said paths in spite of said difference in feed rate.

4. In a milling machine, the combination of a base, a tool spindle rotatably supported from said base, a work table supported from said base, said spindle and table being relatively bodily movable in a plurality of paths transverse to one another and having different power requirements, one of said paths being transverse to the axis of said spindle, a power train connectible to rotate said spindle, and transmission and control mechanism for said relative movement including a feed rate mechanism providing a feed rate changer, a rapid traverse rate mechanism driven to exclude said rate changer, means selective of the one or the other of said rates, a plurality of branch lines each driven from said selective means and respectively for movement in the different paths, and a plurality of overload release devices one of which is positioned in one of said branch lines, said overload release devices being of different effect in correspondence with said different power requirements.

5. A milling machine as specified in claim 4 in which the branch line which includes said overload release device also includes speed reducing means operative for relatively slow movement in the path controlled therefrom.

6. In a milling machine, the combination of a column, a tool spindle rotatably supported therefrom, a work table supported from said column for movement in a plurality of transverse paths having different operating characteristics, a power train for rotating said spindle, and transmission and control mechanism for said table movement including a feed train providing a feed rate changer, a rapid traverse train driven to exclude said rate changer, an element selectively driven from the one or the other of said trains, a plurality of branch lines respectively for different of said paths and each driven from said element, reversing means for said branch lines including a reverser individual to movement in one of said paths, a plurality of overload release devices one of which is positioned in one of said branch lines and provides a maximum torque capacity corresponding to the operating characteristics of the path of movement controlled thereby, element connected for movement of said reverser and a dog operative during movement of said table to shift said trip element.

JOSEPH B. ARMITAGE.

CERTIFICATE OF CORRECTION.

Patent No. 1,969,393. August 7, 1934.

JOSEPH B. ARMITAGE.

It is hereby certified that error appears in the printed specification of the above numbered patent requiring correction as follows: Page 7, line 86, claim 6, before "element" insert the words and automatic control mechanism including a shiftable trip; and that the said Letters Patent should be read with this correction therein that the same may conform to the record of the case in the Patent Office.

Signed and sealed this 11th day of September, A. D. 1934.

(Seal)

Leslie Frazer
Acting Commissioner of Patents.